United States Patent
Bendre et al.

(10) Patent No.: US 12,541,528 B2
(45) Date of Patent: Feb. 3, 2026

(54) SCALABLE WINDOW AGGREGATOR

(71) Applicant: VISA INTERNATIONAL SERVICE ASSOCIATION, San Francisco, CA (US)

(72) Inventors: Mangesh Bendre, San Francisco, CA (US); Fei Wang, Fremont, CA (US); Hao Yang, San Jose, CA (US)

( * ) Notice: Subject to any disclaimer, the term of this patent is extended or adjusted under 35 U.S.C. 154(b) by 0 days.

(21) Appl. No.: 18/848,877

(22) PCT Filed: Mar. 22, 2023

(86) PCT No.: PCT/US2023/015963
§ 371 (c)(1),
(2) Date: Sep. 19, 2024

(87) PCT Pub. No.: WO2024/005883
PCT Pub. Date: Jan. 4, 2024

(65) Prior Publication Data
US 2025/0225140 A1 Jul. 10, 2025

Related U.S. Application Data

(60) Provisional application No. 63/355,938, filed on Jun. 27, 2022.

(51) Int. Cl.
*G06F 16/25* (2019.01)
*H04L 47/22* (2022.01)
(Continued)

(52) U.S. Cl.
CPC .............. *G06F 16/25* (2019.01); *G06F 16/18* (2019.01); *G06F 16/23* (2019.01); *G06N 20/00* (2019.01); *H04L 47/225* (2013.01)

(58) Field of Classification Search
CPC ...... G06F 16/25; G06F 16/23; G06F 16/2458; G06F 17/18; G06N 20/00; G06N 3/044;
(Continued)

(56) References Cited

U.S. PATENT DOCUMENTS 11,546,263 B1 * 1/2023 Klaedtke ............... H04L 47/225
2011/0283295 A1 11/2011 Ali et al.
(Continued)

OTHER PUBLICATIONS

"Spark Streaming Window Operations—A Quick Guide", Available online at: https://techvidvan.com/tutorials/spark-streaming-window-operations/, 18 pages, Feb. 28, 2022.
(Continued)

*Primary Examiner* — Marcin R Filipczyk
(74) *Attorney, Agent, or Firm* — Kilpatrick Townsend & Stockton LLP

(57) ABSTRACT

A method performed by a computer is disclosed. The method includes receiving a dataset including one or more data fields. The computer can then receive instructions to compute an aggregate feature of the dataset. The computer can then determine an operator and a window based on the aggregate feature to be computed. The method may then include the computer processing the dataset. The compute may then apply the operator with the window to the processed dataset to compute the aggregate feature of the dataset.

20 Claims, 9 Drawing Sheets

(51) Int. Cl.
  *G06F 16/18* (2019.01)
  *G06F 16/23* (2019.01)
  *G06N 20/00* (2019.01)

(58) Field of Classification Search
  CPC ......... G06N 3/08; H04L 47/225; H04L 47/27; H04L 47/10
  See application file for complete search history.

(56) References Cited

U.S. PATENT DOCUMENTS

| | | | |
|---|---|---|---|
| 2020/0034406 | A1 | 1/2020 | Abdelnur et al. |
| 2020/0210430 | A1 | 7/2020 | Shen et al. |
| 2021/0124746 | A1 | 4/2021 | Klaedtke |
| 2022/0116793 | A1* | 4/2022 | Osinski ............... H04M 15/41 |
| 2023/0041129 | A1* | 2/2023 | Terlecki ............. G06F 16/2477 |
| 2025/0217377 | A1* | 7/2025 | Terlecki ............. G06F 16/2474 |

OTHER PUBLICATIONS

Bhatotia et al., "Incremental Sliding Window Analytics", Available online at: https://link.springer.com/referenceworkentry/10.1007/978-3-319-63962-8_156-1, Mar. 6, 2018, pp. 1-8.
Gupta, "Shared Variables in Distributed Computing", Available online at: https://blog.knoldus.com/shared-variables-in-distributed-computing/, Jul. 26, 2020, 6 pages.
Application No. PCT/US2023/015963, International Search Report and Written Opinion, Mailed On Jul. 13, 2023, 8 pages.
Verwiebe et al., "Algorithms for Windowed Aggregations and Joins on Distributed Stream Processing Systems", Datenbank-Spektrum Available Online at : https://link.springer.com/article/10.1007/s13222-022-00417-y, Jun. 9, 2022, pp. 99-107.
Benson, "Efficient Distributed In-Network Window Aggregation", Master thesis, Nov. 1, 2019, 99 pages.
Application No. EP23832061.8, Extended European Search Report, Mailed On Sep. 29, 2025, 11 pages.

* cited by examiner

SCALABLE WINDOW AGGREGATOR

CROSS-REFERENCES TO RELATED APPLICATIONS

This application is a 371 application of PCT application number PCT/US2023/015963, filed Mar. 22, 2023, which claims priority to U.S. provisional application No. 63/355,938 filed on Jun. 27, 2022, which are herein incorporated by reference in its entirety.

BACKGROUND

Aggregate features of a dataset are used in the training and live use of many machine learning models. Window aggregate functions can be used to calculate aggregate features such as the sum, average, minimum, or maximum of a large dataset over a window. The aggregate features calculated by windowed aggregate functions can be used in the training of, and live use of artificial intelligence models. However, many current implementations of window aggregate functions are not efficient when applied to large datasets. The runtime to calculate aggregate features of large datasets can be improved. Further, a skew in the dataset or missing values in the dataset adversely impacts the runtime of aggregate feature computations.

Embodiments of the disclosure address this problem and other problems individually and collectively.

SUMMARY

One embodiment of the disclosure includes a method. The method comprises: storing a dataset comprising N data measurement vectors, each data measurement vector comprising a time field and a data field, wherein N is at least 100,000, wherein the data field of each data measurement vector comprises a measured value of a property of a network system for a corresponding time value: receiving a command to compute an aggregate feature vector of an aggregate feature of the dataset, wherein the aggregate feature vector includes a respective aggregate value of the data field for each of a plurality of sliding time windows spanning the dataset: determining an operator for determining the respective aggregate values and a window size for the aggregate feature to be computed: for a first time window, determining with the operator a first aggregate value using the measured values of first data measurement vectors having the time field within the first time window: advancing a window pointer to define a second time window, wherein the second time window overlaps with the first time window, and wherein the second time window includes second data measurement vectors: identifying a first portion of the first measurements vector(s) that are not within the second time window: identifying a second portion of the second measurements vector(s) that are not within the first time window: determining, using the operator, a second aggregate value by: removing the measured value(s) for the first portion of the first measurements vector(s) from the first aggregate value; and including the measured value(s) for the second portion of the second measurements vector(s) within the first aggregate value; and repeating advancing of the window pointer for successive time windows and repeating identification of data measurement vectors to remove and to include, for the operator to determine successive aggregate values for successive time windows of the plurality of sliding time windows.

Another embodiment of the invention includes a computer. The computer comprising a processor; and a non-transitory computer readable medium comprising instructions executable by the processor to perform operations including: storing a dataset comprising N data measurement vectors, each data measurement vector comprising a time field and a data field, wherein N is at least 100,000, wherein the data field of each data measurement vector comprises a measured value of a property of a network system for a corresponding time value: receiving a command to compute an aggregate feature vector of an aggregate feature of the dataset, wherein the aggregate feature vector includes a respective aggregate value of the data field for each of a plurality of sliding time windows spanning the dataset: determining an operator for determining the respective aggregate values and a window size for the aggregate feature to be computed: for a first time window, determining with the operator a first aggregate value using the measured values of first data measurement vectors having the time field within the first time window: advancing a window pointer to define a second time window, wherein the second time window overlaps with the first time window, and wherein the second time window includes second data measurement vectors; identifying a first portion of the first measurements vector(s) that are not within the second time window: identifying a second portion of the second measurements vector(s) that are not within the first time window: determining, using the operator, a second aggregate value by: removing the measured value(s) for the first portion of the first measurements vector(s) from the first aggregate value; and including the measured value(s) for the second portion of the second measurements vector(s) within the first aggregate value; and repeating advancing of the window pointer for successive time windows and repeating identification of data measurement vectors to remove and to include, for the operator to determine successive aggregate values for successive time windows of the plurality of sliding time windows.

A better understanding of the nature and advantages of embodiments of the invention may be gained with reference to the following detailed description and accompanying drawings.

DETAILED DESCRIPTION

Figure 1:
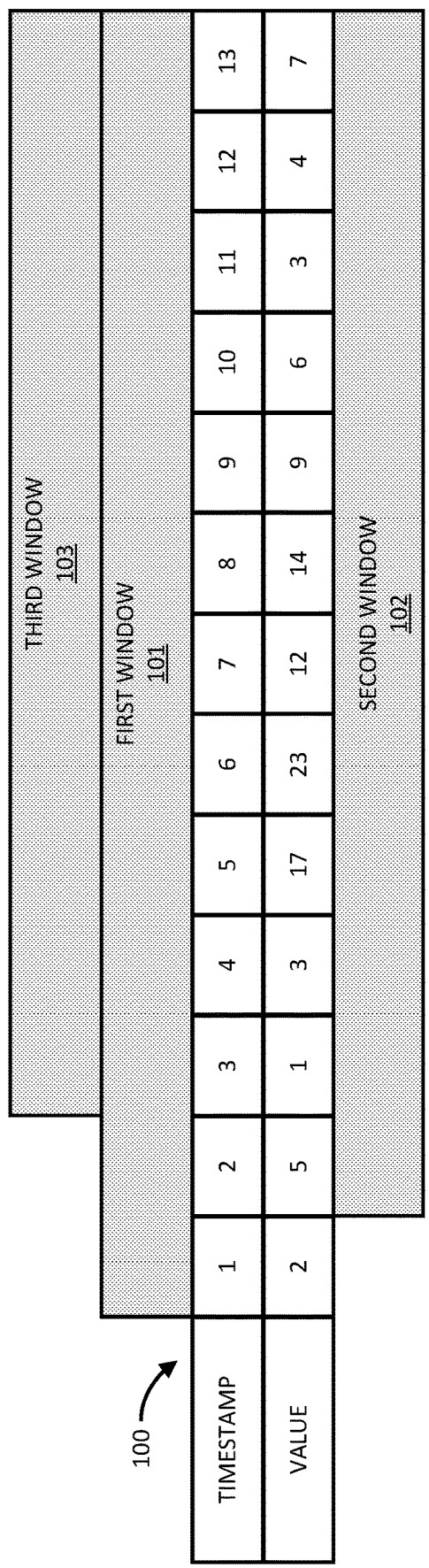
FIG. 1 shows a block diagram of a dataset with overlapping windows according to embodiments.

Window aggregations are calculations that compute aggregate features of a dataset. Aggregate features are used in many machine learning and artificial intelligence models that can capture both short and long term behaviors of the dataset. Embodiments use existing distributed system frameworks to order large datasets and apply a shared computation framework to perform aggregate feature calculations. The calculation of aggregate features performs an operation on sliding windows of a dataset, where the sliding windows overlap in time.

Embodiments share computations when performing multiple operations to compute multiple aggregate features of a dataset. In the process of computing the multiple aggregate features of a dataset, results from a previous window can be reused, so as to use less memory and more efficiently perform the computation. For example, while sliding a window through the dataset, an aggregate value for a previous, overlapping, window can be used to determine the aggregate value for the next window by: (1) adding the values for the new data in the dataset that appear in the next window, but not in the previous window, and (2) subtracting out the values of the data that was in the previous window, but does not appear in the next window. In this manner, embodiments provide for an efficient method to perform calculations using sliding windows. Such a method of computation makes the computation complexity of most aggregate functions independent of the window size, or the number of data elements in the window. In addition, embodiments may share computation results to compute further aggregate features of a dataset. For example, if aggregate features of a dataset including a sum and a count have been computed, an average aggregate feature of the dataset can be simply computed using the sum and the count.

Embodiments share data when performing multiple operations to calculate multiple aggregate features of a dataset. When computing multiple aggregate features of a dataset, multiple windows can be applied to the same data. For example, as embodiments compute multiple aggregate features of a dataset, two windows can be applied to the same piece of data. Each one of the two windows may include a window pointer that can point to a specific piece of data that the window is being applied to. Through the use of window pointers, the same copy of the dataset can be reused for both calculations, providing for a significant reduction to the memory requirement of operating with large window sizes.

I. Window Aggregate Functions

Window aggregates functions are functions that can be used to calculate aggregate features (e.g., sum, count, average, min, max, distinct count, etc.) of datasets of events (e.g., interactions) by applying a window (e.g., a time interval) to the dataset. For example, for a time series of interactions that occur in 24 hours, a sliding window implementing an aggregate feature calculation can be applied to the time series. The sliding window can be used to calculate the total amount of interactions in each 10 minute window of the 24 hours. Assuming the time series holds data for each minute of the 24 hours, the sliding window can calculate a total of 1431 features (e.g., 1431=total minutes-(window size+1)= (24 hours*60 minutes)−10 minute window+1). Many of these windows contain overlapping timestamps. For example, a first window can contain data of minutes 0 through 10 and a second window can contain data of minutes 1 through 11, meaning the two windows both contain data of minutes 1-10. In part due to this overlap, implementations of window aggregate functions are not efficient when they are applied to large datasets. The runtime and memory requirement of such a calculation proves to be cumbersome.

A. Example Dataset

FIG. 1 shows a block diagram of a dataset 100 with overlapping windows according to embodiments. A first window 101, a second window 102, and a third window 103 may be applied to the dataset 100. Each of the three windows may be a sliding window and have a size of three, and as shown in FIG. 1, the windows are overlapping. The first window 101 includes the 1-3 timestamps, the second window 102 includes the 2-4 timestamps, and the third window 103 includes the 3-5 timestamps. As stated above, many implementations of window aggregate functions are not efficient. For example, to calculate the sum of values in the first window 101, the three values associated with the timestamps 1-3 would be summed, to calculate the sum of values in the second window 102, the three values associated with the timestamps 2-4 would be summed, and to calculate the sum of values in the third window 103, the three values associated with the timestamps 3-5 would be summed.

Adjacent windows include two-thirds of the same timestamp (e.g., the first window 101 and the second window 102 include the timestamps 2 and 3, the second window 102 and the third window 103 include the timestamps 2 and 4). The computation of the sum for adjacent windows thus includes two-thirds of the same elements. As the amount of windows increases, so does the amount of repeated calculations. In addition, several implementations of window aggregate functions require unique data structures, meaning, the dataset 100 is copied an amount of times equal to the amount of windows. For a very large dataset, the amount of repeated computations and the amount of copies of the dataset 100 grows substantially as the window is slid through the dataset 100.

A window aggregate function may compute the desired aggregate feature by applying an operator with a window to a dataset. The operator may implement the computation of the aggregate feature (e.g., a sum operator, a count operator, an average operator, a minimum operator, a maximum operator, a distinct count operator, etc.). The window may implement the time interval (e.g., 30 seconds, one minute, 10 minutes, 15 minutes, 30 minutes, 1 hour, 4 hours, etc.) that the aggregate feature is to be calculated for.

The operator with the appropriate window can then be applied to the dataset to compute the desired aggregate feature of the dataset. For example, the dataset 100 may be a dataset of interactions occurring during a week may be used (although only 13 timestamps are shown). An aggregate feature of the dataset, such as the sum of interactions in the last 1 hour may be computed. To compute such an aggregate feature of the dataset 100, a sum operator with a window of size 1 hour (e.g., assuming the timestamps in the dataset 100 are minutes, the window would have a size of 60) can be applied to the interaction value data field of the dataset 100. The window may initially include the first hour block of the dataset 100, and compute a sum of the interactions in that first hour block. After the sum of the first hour has been computed, the window can be slid to the next timestamp to calculate the sum of interactions in the second hour block. The process may be repeated until a sum of each hour block of the dataset is computed. Embodiments provide for an efficient method to perform such a computation.

A scalable window aggregator can be used to compute an aggregate feature of a dataset. The scalable window aggregator provides for a method to compute aggregate features of datasets such that the computation complexity of most aggregate functions is independent of the window size, or the number of data elements in the window.

B. Interaction Dataset

Figure 2:
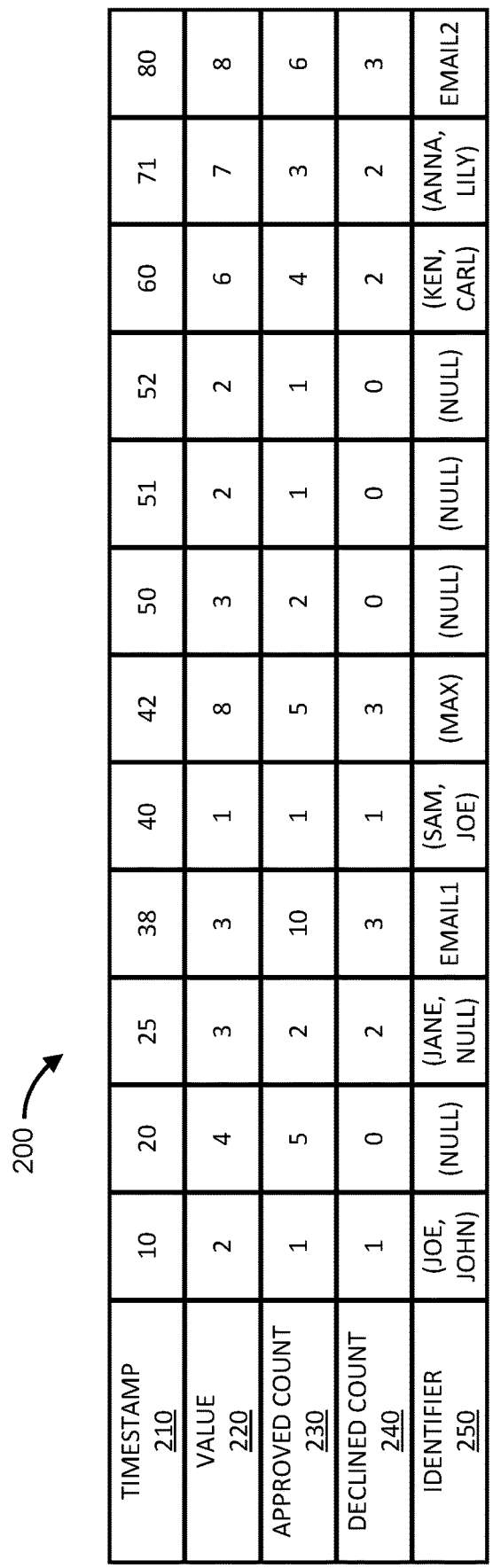
FIG. 2 shows a block diagram of an interaction dataset according to embodiments.

FIG. 2 shows a block diagram of a interaction dataset 200 according to embodiments. The interaction dataset 200 can include events ordered by a timestamp stored in the timestamp 210 data row. The interaction dataset 200 can include data of events occurring during the timestamp. An example of the interaction dataset 200 can be a transaction dataset that logs the value of transactions occurring at the timestamp in the timestamp 210 data row, the count of approved interactions occurring at the timestamp in the approve count row 230, the count of declined interactions occurring at the timestamp in the declined count row 240, and an identifier of one or more interaction parties (e.g., a name, an email address, a phone number, etc.) in the identifier row 250. Similar datasets to the interaction dataset 200 may include a traffic dataset that logs the amount of cars passing through a toll gate, a network traffic dataset that logs the amount of network traffic requests to a website, etc. The interaction dataset 200 can be of any length, such as 100, 1,000, 10,000, 20,000, 50,000, 100,000, 500,000, 1 million, 1 billion, or more.

Such datasets can store data of millions of interactions occurring each day for numerous entities, such as merchants, merchant categories, zip codes, etc. Interaction dataset 200 corresponds to one entity. For example, a payment processing network may process hundreds of millions of transactions per day, and more store data of each of those transactions in a dataset similar to the interaction dataset 200. When calculating aggregate features of such datasets, a window is slid through the interaction dataset 200 to determine a first aggregate feature value. The window is slid through each subsequent timestamp of the data to calculate subsequent aggregate feature values for different window spans. However, as the window is slid through subsequent timestamps, the window spans are largely overlapping.

The interaction dataset 200 may be processed to improve the efficiency of aggregate feature calculation. A distributed system can distribute the dataset to a variety of processing nodes, such that computations can parse through only the relevant data (i.e., a computation for an average interaction value does not need to know the identifier of the transacting party). One example of such a distributed system includes the SPARK framework. The SPARK framework may be run to distribute portions of the dataset to different processing nodes. For example, the SPARK framework, or some other distributed system, may distribute the interaction dataset 200 to different processing nodes based on the timestamp value such that the computation load is evenly distributed (e.g., by mapping each column by the timestamp modulated by the total number of processing nodes). By evenly distributing the computations, no one processing node would have a longer runtime than any other because they are all processing the same amount.

However, some distributed systems distribute all null values in the dataset to the same processing node, which results in that processing node having an abnormally long runtime. For example, when distributing a table to processing nodes, each time the SPARK framework identifies a null value in the table the SPARK framework will send every null value to a single processing node. For a large dataset potentially containing a large amount of null values, such as a transaction dataset, this could lead to that single processing node having a very long runtime.

In order to combat this, a null value in the dataset may first be processed by replacing the null value with an identifiable random value. In doing so, the calculation is more evenly distributed which leads to a reduction in data skew caused by null values. For example, if an aggregate feature is being calculated for a specific email (e.g., johndoe@email.com) some entries in the dataset may have a null value in the email data field. Each null value may be prefaced with an identifiable random value. For example, if there are a total of 100 processing nodes, a random number between 1 and 100 may be appended to the beginning of the null value, such that the null values get mapped to a random processing node in each of the 100 total processing nodes. The aggregate feature may then be computed, and the operators on each of the processing nodes may be configured to identify the null entries by the identifiable random value and ignore the computation for every null entry.

II. Scalable Window Aggregator

A scalable window aggregator provides a framework to compute aggregate features of a dataset. Examples of such a dataset can include the datasets shown in FIGS. 2 and 3. The datasets previously shown may be in some other data structure.

A. Exemplary Data Structure

Figure 3:
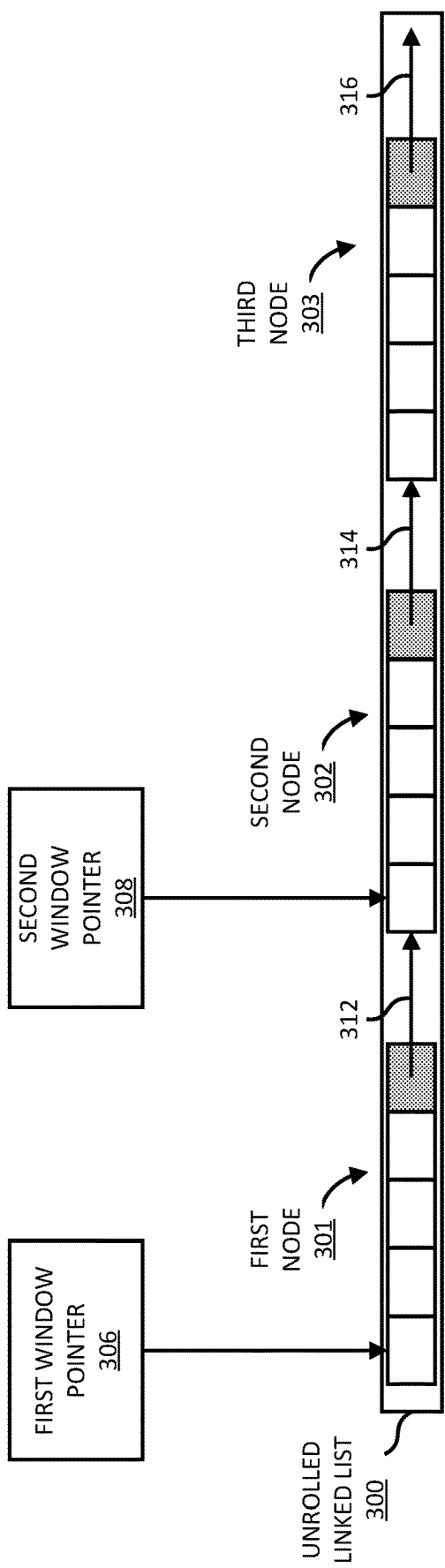
FIG. 3 shows a block diagram of a windows and unrolled linked list according to embodiments.

FIG. 3 shows a block diagram of a windows and unrolled linked list 300 according to embodiments. FIG. 3 shows an example data type that can be used by a scalable window aggregator to compute an aggregate feature of a dataset. Other data types that may be used by the scalable window aggregator include linked lists, arrays, stacks, queues, or any other linear data structure. Different data types can provide for different benefits. For example, the use of an unrolled linked list provides for a data type in which it is simple to insert elements at the tail end and remove elements from the head end in addition to low overhead for memory usage and memory allocation. An unrolled linked list 300 can comprise of a first node 301, a second node 302, and a third node 303 can hold a data field of an input dataset. For example, the nodes of the unrolled linked list 300 may hold the value data field of the interaction dataset 200. In some examples, the input dataset may be processed by a distributed system to improve the efficiency and reduces the memory requirement of performing the computation, and the resultant processed input dataset can be the unrolled linked list 300.

Each node in the unrolled linked list 300 may have a tail pointer. The tail pointer of a node points to the subsequent node. For example, a tail pointer 312 of the first node 301 can point away from the right most block of the first node 301 and to the second node 302, a tail pointer 314 of the second node 302 can point to the third node 303, and a tail pointer 316 of the third node 303 can point to a currently non-existing node. When a new node is to be added to the unrolled linked list 300 (e.g., more data of a dataset is received), the tail pointer of the node (e.g., the tail pointer 316 of the third node 303) may be retrieved, and the tail pointer may be set to point to the new node. In some implementations, nodes of an unrolled linked list may comprise a head pointer in addition to a tail pointer. However, if only a tail pointer is used, automatic memory freeing can be implemented by recollecting the node after reaching a tail pointer.

As opposed to some current implementations that store the data within each window, a window may comprise a window pointer that points to a block of a node. This reduces the memory requirement of performing the computation, as if new windows are added, the data does not have to be copied to the new window and instead the new window can simply be applied to the already existing unrolled linked list. In the example of FIG. 3, a first window pointer 306 of a first window can point to the first block of the first node 301. A second window pointer 308 may correspond to a second time window. Examples of the second time window are described below.

As a first example, the first window pointer 306 of the first window may slide through the data in the first node 301 until it reaches the tail pointer 312 of the first node 301. For example, the first node 301 may store data that has a timestamp between 1 and 100, the second node 302 may store data that has a timestamp between 101 and 200, and the third node 303 may store data that has a timestamp between 201 and 300. The first window pointer 306 may be correspond to a time window of 10 seconds and may initially point to the first block of the first node 301. After calculating the appropriate aggregate feature, the window pointer of the first window pointer 306 can be moved to point to the second block of the first node 301. The appropriate aggregate feature may be calculated, and the first window pointer 306 may then be moved to point to the third block of the first node 301, continuing on until reaching the tail pointer 312 of the first node 301. After reaching the tail pointer 312, the first window pointer 306 may continue to the first timestamp of the second node 302 as illustrated by the second window pointer 308. Such an example is illustrated by FIGS. 4A-4B and FIGS. 5A-5B.

Figure 5:
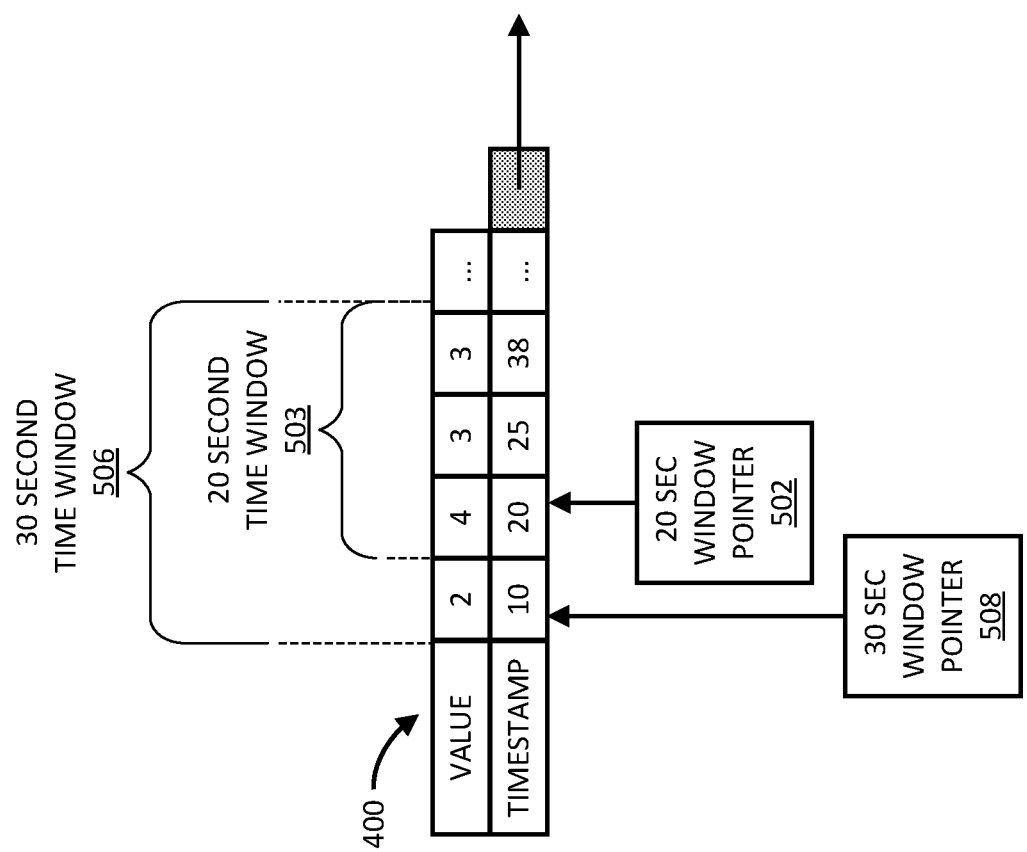
FIG. 5 shows a block diagram of two sum aggregate feature calculations performed using a 20 second time window and a 30 second time window according to embodiments.

As a second example, the second window pointer 308 can be a window pointer of a second window of a different size than the first window pointer 306. One such example could be the first window pointer 306 being of a time window of 10 seconds that is used to calculate a sum of the last 10 seconds and the second window pointer 308 being of a time window of 10 minutes that is used to calculate a sum of the last 10 minutes. Such an example is illustrated by FIG. 5.

As opposed to many current implementations of aggregate feature calculations, different windows can be applied to the same unrolled linked list 300 and the unrolled linked list 300 does not need to be reproduced or copied in any manner. In this manner, different windows can share data to reduce the memory requirement to calculate multiple aggregate features of a dataset, as the data held by the unrolled linked list 300 does not need to be reproduced in any manner.

B. Sum Aggregate Feature Calculation

Figure 4:
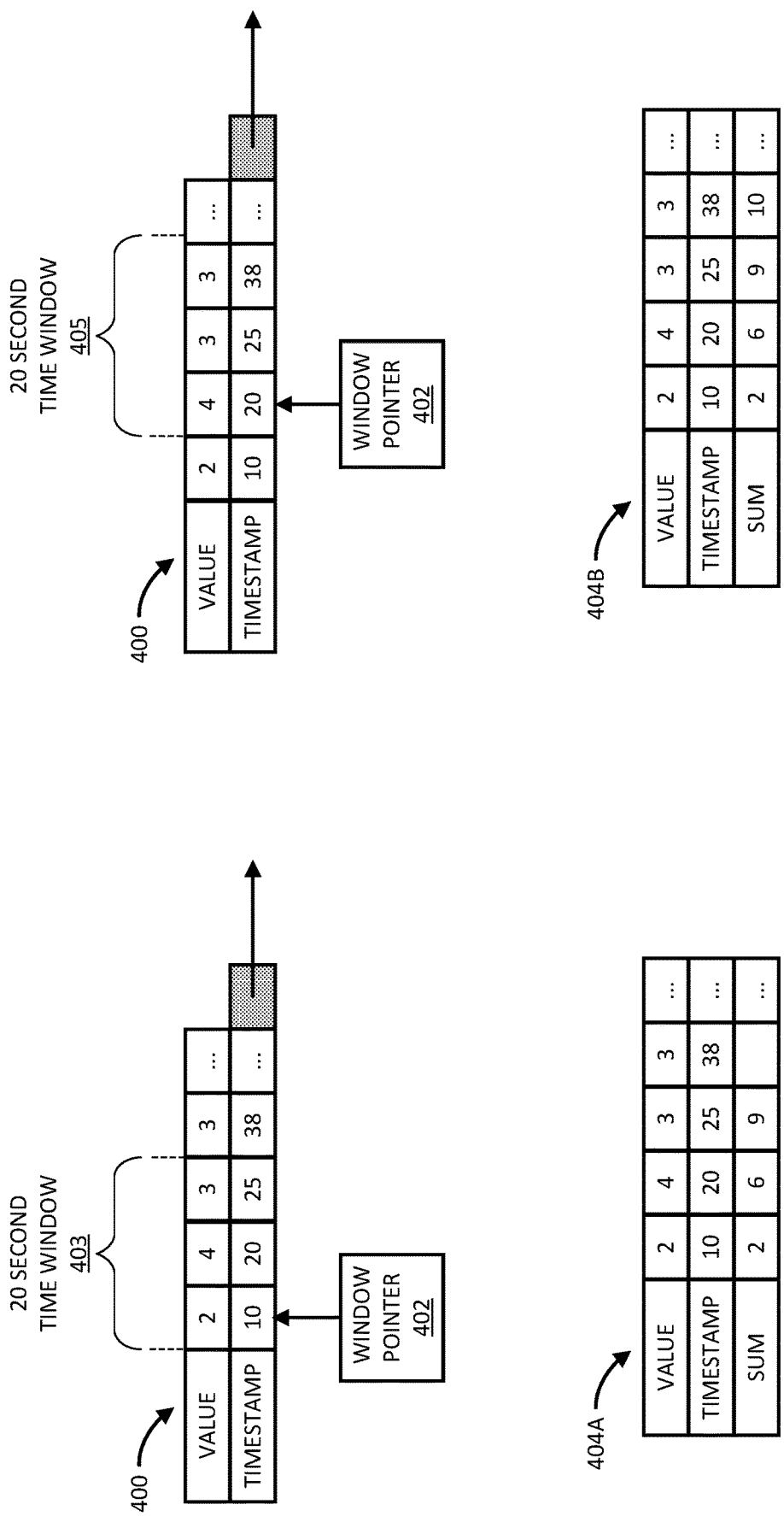
FIGS. 4A and 4B show a block diagram of an aggregate feature calculation according to embodiments.

Each aggregate feature calculation can be implemented by applying an operator with a window to a data field. The calculation slides the window through the data field, applying the operator at each step. While sliding a window through a data field, an aggregate value for a previous window can be used to determine the aggregate value for the next window by adding values for the new data in the next window but were not in the previous window. Additionally, values for the data that was in the previous window, but are not in the next window, would be subtracted. In this manner, calculations for sliding windows can be done efficiently. This incremental method of computation makes the computation complexity for most aggregate functions independent of the window size. FIG. 4 illustrates an example of calculating a sum aggregate feature using a sliding window.

FIGS. 4A and 4B shows a block diagram of a sum aggregate feature calculation according to embodiments. In the example of FIG. 4A, an aggregate feature of the sum of the interaction value in the last 20 seconds may be desired. A sum operator may be selected and a 20 second time window 403 may be selected. A dataset 400 may include at least the (value, timestamp) combination of [(2, 10), (4, 20), (3, 25), (3, 38)]. The dataset 400 may be a dataset of length 100, 1,000, 10,000, 20,000, 50,000, 100,000, 500,000, or more. A moving condition can be used to properly perform the streaming calculation of the data according to the window size. The moving condition is the Boolean value of (window pointer<current timestamp−window size). Once the moving condition is "True," the window pointer is moved, and the rolling sum is updated accordingly. The sum operator is initialized with a sum value of 0.

At the first timestamp, the window pointer 402 of the 20 second time window 403 points to the timestamp 10. The sum operator updates the sum value to equal 0+2=2 as shown in an aggregate feature computation 404A. The moving condition is then checked to determine if the timestamp that the window pointer currently points to (e.g., the first timestamp of 10) is within the window pointer time (e.g., the current timestamp−window time). The moving condition is equal to (10<10−20)="False." so no further action is taken.

At the second timestamp, the sum operator updates the sum value to equal 2+4=6 as shown in the aggregate feature computation 404A. The moving condition is then checked and is currently equal to (10<20−20)="False." so no further action is taken.

At the third timestamp, the sum operator updates the sum value to equal 6+3=9 as shown in the aggregate feature computation 404A. The moving condition is then checked and is currently equal to (10<25−20)="False." so no further action is taken.

At the fourth timestamp, the sum operator updates the sum value to equal 9+3=12. The moving condition is then checked and is currently equal to (10<38−20)="True," so the window pointer 402 of a 20 second time window 405 is moved forward by a step and will now point to the second timestamp as shown in FIG. 4B. The sum operator then removes the value 2, which corresponds to the block across which the window pointer is moved from (e.g., the first timestamp of 10 seconds), as it is not in the current window span. As such, the sum operator updates the sum value to equal 12−2=10, as shown in an aggregate feature computation 404B. Additionally, because the window pointer now points to the second timestamp, the new moving condition is now equal to (20<current timestamp−20). This incremental method of computation makes the computation complexity of the computation independent of the window size, as when the window pointer 402 is moved to the position of the 20 second time window 405, the rolling sum is modified by subtracting the values exiting and adding the values entering the current window span.

C. Re-Use of Values for Window of Different Sizes

As described above in section II.A, multiple windows can be applied to a single dataset without the need to copy or reproduce the data. Through the use of window pointers, different sizes of time windows can be applied to a single dataset to compute different aggregate features of the dataset.

FIG. 5 shows a block diagram of two sum aggregate feature calculations performed using a 20 second time window 503 and a 30 second time window 506 according to embodiments. To calculate different aggregate features of the dataset 400, multiple windows may be applied to the same dataset 400 of FIGS. 4A and 4B. The 20 second time window 503 can compute the sum of the interaction value in the last 20 seconds as described above in FIGS. 4A and 4B. The 30 second time window 506 can simultaneously or subsequently compute the sum of the interaction value in the last 30 seconds by sliding a 30 second time window pointer 408 through the dataset 400 using a process similar to the process described in FIGS. 4A and 4B. The moving condition for 30 second window pointer 508 of the 30 second time window would be (30 second window pointer<current timestamp−30 seconds). Such a moving condition would mean that the 30 second window pointer 508 stays at the first timestamp of 10 seconds longer as compared to the 20 second window pointer 502.

The scalable window aggregator allows for the sum of the interaction value of a time window calculated efficiently. Many current implementations of aggregate feature calculations store data in relation to a window. Using FIG. 5 as an example, the 20 second time window 503 would copy the dataset 400 between at least the 10 and 25 second timestamps. As the 20 second window pointer 502 of the 20 second time window 503 slides through the dataset 400, or as other windows such as the 30 second time window 506 are applied to the dataset 400, many copies of the dataset 400 would be created. For example, a first copy of the dataset 400 would be created for the 20 second time window 503, and a second copy of the dataset 400 would be created for the 30 second time window 506. Additional copies of the data would be required to compute the sum of the interaction value for different time windows. One can see that many copies of the dataset 400 would be required if both the 20 second time window 503 and the 30 second time window 506 are slid through the dataset 400. Embodiments instead use the window pointers of the time windows simply as a pointer to the nodes of dataset 400, such that the dataset 400 does not need to be reproduced which reduces the memory requirement of computing aggregate features significantly.

Similar to the computation of the sum of the interaction value in the last 20 seconds, an aggregate feature of the count of interactions in the last 20 seconds may be computed in a similar manner. For example, if the value column was labeled as "count" instead of "value," the aggregate feature of the count of interactions in the last 20 seconds would have been computed instead. Further, if both the sum of the interaction value in the last 20 seconds and the count of the interactions in the last 20 seconds are computed (simultaneously or otherwise), the average interaction value in the last 20 seconds may be easily computed by dividing the sum of the interaction value in the last 20 seconds by the count of the interactions in the last 20 seconds. More explicitly, a sum operator can be applied to the dataset 400 as described in FIGS. 4A and 4B to determine the sum of the interaction value in the last 20 seconds, and a count operator can be applied to the dataset 400 to determine the count of interactions in the last 20 seconds in a similar manner. An average operator can then be applied to the dataset 400 and can retrieve the sum of the interaction value in the last 20 seconds computed by the sum operator and then retrieve the count of interactions in the last 20 seconds. The average operator can then determine the average interaction value in the last 20 seconds by dividing the sum of the interaction value in the last 20 seconds by the count of the interactions in the last 20 seconds.

D. Maximum and Minimum Aggregate Feature Calculation

The scalable window aggregator framework can be used to compute other types of aggregate features. Other examples of aggregate features can include a maximum, minimum, or unique count of a dataset.

Figure 6B:
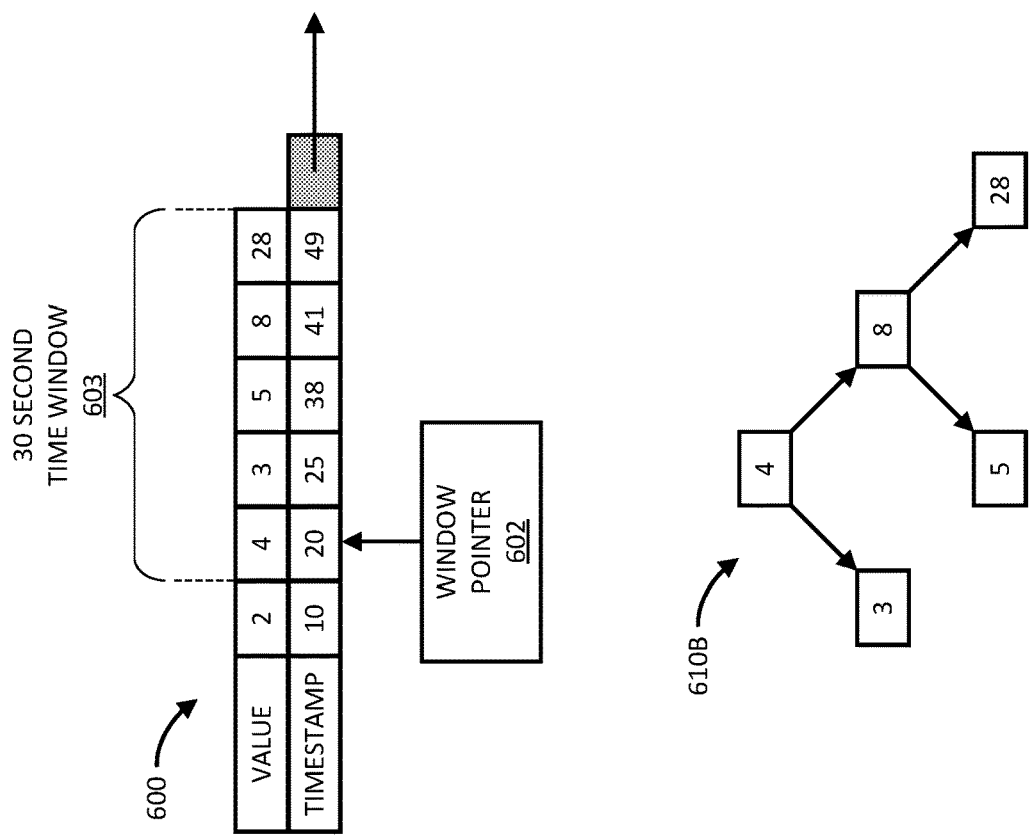
FIGS. 6A and 6B shows a block diagram of a minimum and maximum aggregate feature calculation according to embodiments.
Figure 6A:
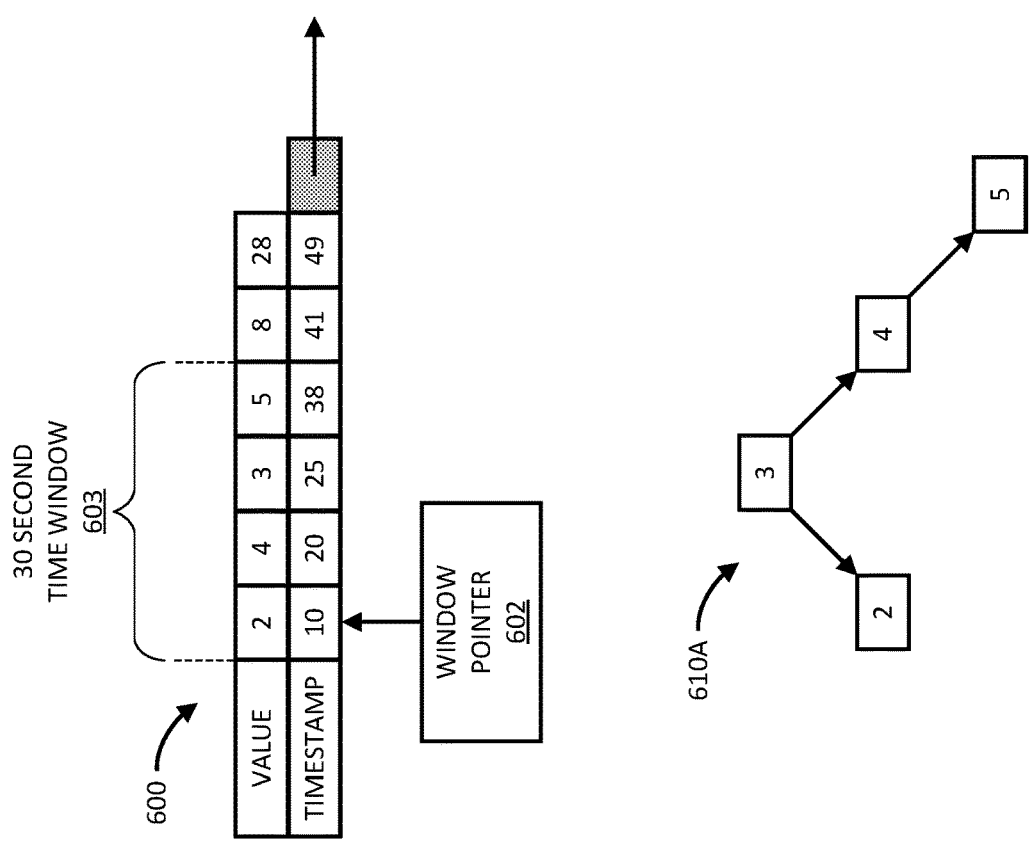

FIGS. 6A and 6B shows a block diagram of a minimum and maximum aggregate feature calculation according to embodiments. A dataset 600 used in the example shown in FIG. 5 may include at least the (value, timestamp) combination of [(2, 10), (4, 20), (3, 25), (5, 38), (8, 41), (28, 49)]. The dataset 600 may have any length, such as 100, 1,000, 10,000, 20,000, 50,000, 100,000, 500,000, or more. A 30 second time window 603 may be applied to the dataset 600. Similar to the process described with respect to FIG. 4, a window pointer 602 of the 30 second time window 603 may slide through the dataset 600. A maximum operator or a minimum operator may use a tree map, such as a red-black tree map, to compute a maximum value and/or minimum value aggregate feature of the dataset.

In the example of FIGS. 6A and 6B, a red-black tree map is used. A red-black tree map orders nodes (e.g., values) according to at least the following properties: (1) it obeys the binary search tree property (e.g., children are to the left of the parent node if the value of the child is less than the value of the parent, children are to the right of the parent node if the value of the child is greater than the value of the parent), (2) every node is black or red, (3) the root node is black, (4) children of a red node must be black, and (5) every path from a parent node to a NULL node contains the same number of black nodes.

At the first timestamp, the window pointer 602 of the 30 second time window 603 points to the timestamp 10. The maximum operator updates a tree map 610A to include "2" as shown in FIG. 6A. The moving condition is then checked to determine if the timestamp that the window pointer 602 currently points to (e.g., the first timestamp of 10) is within the window pointer time (e.g., the current timestamp-window size). The moving condition is equal to (10<10−30)="False," so no further action is taken.

At the second timestamp, the maximum operator updates the tree map 610A to include "4" as shown in FIG. 6A. An ordering of the tree map 610A is then performed according to the red-black tree map properties described above. The moving condition is then checked, and is currently equal to (10<20−30)="False." so no further action is taken.

At the third timestamp, the maximum operator updates the tree map 610A to include "3" as shown in FIG. 6A. An ordering of the tree map 610A is then performed according to the red-black tree map properties described above. The moving condition is then checked, and is currently equal to (10<25−30)="False." so no further action is taken.

At the fourth timestamp, the maximum operator updates the tree map 610A to include "5" as shown in FIG. 6A. An ordering of the tree map 610A is then performed according to the red-black tree map properties described above. The moving condition is then checked, and is currently equal to (10<38−30)="False," so no further action is taken.

At the fifth timestamp, the maximum operator updates the tree map 610B to include "8" as shown in FIG. 6B. An ordering of the tree map 610B is then performed according to the red-black tree map properties described above. The moving condition is then checked, and is currently equal to (10<41−30)="True," so the window pointer 602 of the 30 second time window 603 is moved forward by a step and will now point to the second timestamp as shown in FIG. 6B. The maximum operator can then determine that the maximum value of the previous window is equal to the value "5." The maximum operator then removes the value "2", which corresponds to the block across which the window pointer is moved from (e.g., the first timestamp of 10 seconds), as it is not in the current window span. As the window pointer 602 now points to the second timestamp, the new moving condition is now equal to (20<current timestamp−30).

At the sixth timestamp, the maximum operator updates the tree map 610B to include "28" as shown in FIG. 6B. An ordering of the tree map 610B is then performed according to the red-black tree map properties described above. The moving condition is then checked, and is currently equal to (20<49−30)="False." so no further action is taken. The maximum operator may later determine maximum value of the current window is equal to "28."

In some implementations, the maximum value and the minimum value can be determined simultaneously by applying a minimum operator along with the maximum operator. For example, when the moving condition is "True" at the fifth timestamp, the minimum operator can retrieve the tree map 610B generated by the maximum operator. The minimum operator can then be applied to the tree map 610B to determine that the minimum value of the previous window is equal to the value "2." Similarly, after the sixth timestamp, the minimum operator can determine that the minimum value of the window is equal to "3." By simultaneously applying both minimum operator and the maximum operator, the memory requirement of storing the tree map and the computational complexity of maintaining the tree map is reduced since they share the tree map with each other.

As illustrated by FIGS. 6A and 6B, a maximum operator or a minimum operator may make use of a tree map in order to compute the maximum or minimum of a dataset. A unique count operator may make use of the tree map that is computed by a maximum operator. For example, the size of the tree map may be used to determine the unique count of interaction values. The tree map 610A in FIG. 6A has a size of 4, which corresponds to the unique count of interactions value that occurred (e.g., 2, 3, 4, and 5 occur in the first window span) and the tree map 610B of FIG. 6B has a size of 5 (e.g., 3, 4, 5, 8, and 28 occur in the second window span).

III. Computation Structure

Figure 7:
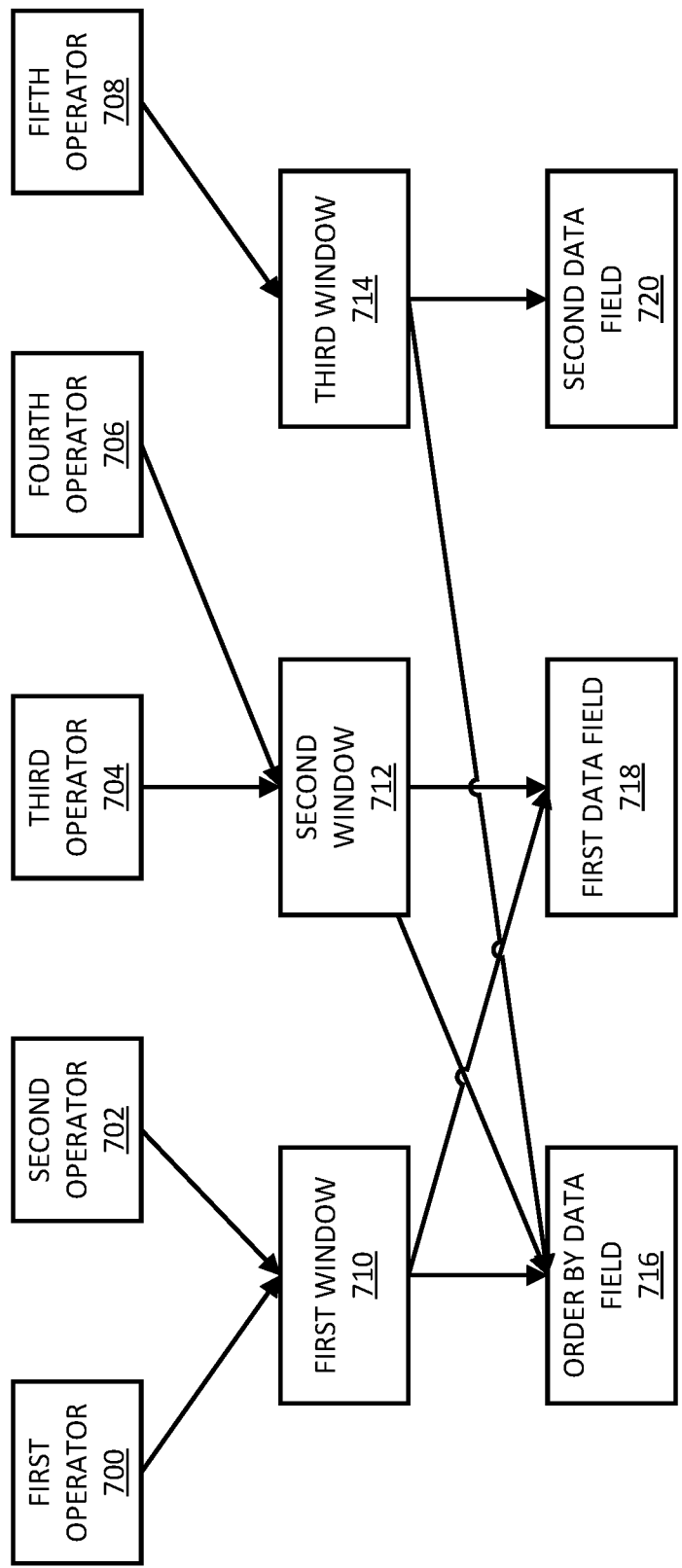
FIG. 7 shows a block diagram of a system architecture according to embodiments.

FIG. 7 shows a block diagram of a system architecture according to embodiments. The system architecture can be used to compute an aggregate feature of a dataset. The system architecture can be modified to accommodate the computation of the desired aggregate feature of the dataset. For example, although FIG. 7 shows three windows, more or less windows can be in the system architecture to calculate the aggregate feature of the dataset.

A. Operators

The system architecture can include a plurality of operators, such as a first operator 700, a second operator 702, a third operator 704, a fourth operator 706, and a fifth operator 708. As an example, the first operator 700 may be a sum operator, the second operator 702 may be a count operator, the third operator 704 may be a maximum operator, the fourth operator 706 may be a minimum operator, and the fifth operator 708 may be a distinct count operator. In some examples, each operator may be constructed such that they operate on primitive data types (e.g., integer, float, string, etc.) to further reduce the memory requirement and increase the calculation efficiency at the cost of code complexity.

B. Windows

The system architecture can also include a plurality of windows, such as a first window 710, a second window 712, and a third window 714. The plurality of windows can correspond to the time intervals that aggregate features will be calculated for. For example, if the sum of a interaction value in the last 10 minutes, the count of approved interactions in the last 30 minutes, and the maximum of the interaction value in the last 4 hours is desired, the first window 710 can be a 10 minute window, the second window 712 can be a 30 minute window, and the third window 714 can be a 4 hour window.

C. Data Fields

The system architecture can additionally include a plurality of data fields of an input dataset, such as an order by data field 716, a first data field 718, and a second data field 720. The order by data field 716 can correspond to the timestamp of the data set. For example, the timestamp field of the dataset 100 can correspond to the order by data field 716. The first data field 718 and the second data field 720 can correspond to other data fields of the input data set. For example, the first data field 718 can correspond to the value field of the interaction dataset 200, and the second data field 720 can correspond to the approved count field of the interaction dataset 200.

D. Computation Sharing

As shown in FIG. 7, some operators may share windows and some windows may share data fields. For example, the minimum interaction value in the last 30 minutes and the maximum interaction value in the last 30 minutes can be calculated similarly. To calculate the described aggregate features, the third operator 704 (e.g., a minimum operator) with the second window 712 (e.g., a window of 30 minutes) can be applied to the first data field 718 (e.g., an interaction value data field) and the fourth operator 706 (e.g., a maximum operator) with the second window 712 can be applied to the first data field 718. In some examples, the different operators can share computations between each other. As a simple example, an average operator can retrieve the result of a sum operator and a count operator and compute the average as the average=sum/count. Another example can include a minimum operator retrieving a tree map generated by a maximum operator to determine a minimum value in addition to the maximum value (or vice-versa). Yet another example can include a unique count operator retrieving the tree map created by a maximum operator (or a minimum operator) and computing the unique count as the size of the tree map.

IV. Method

Figure 8:
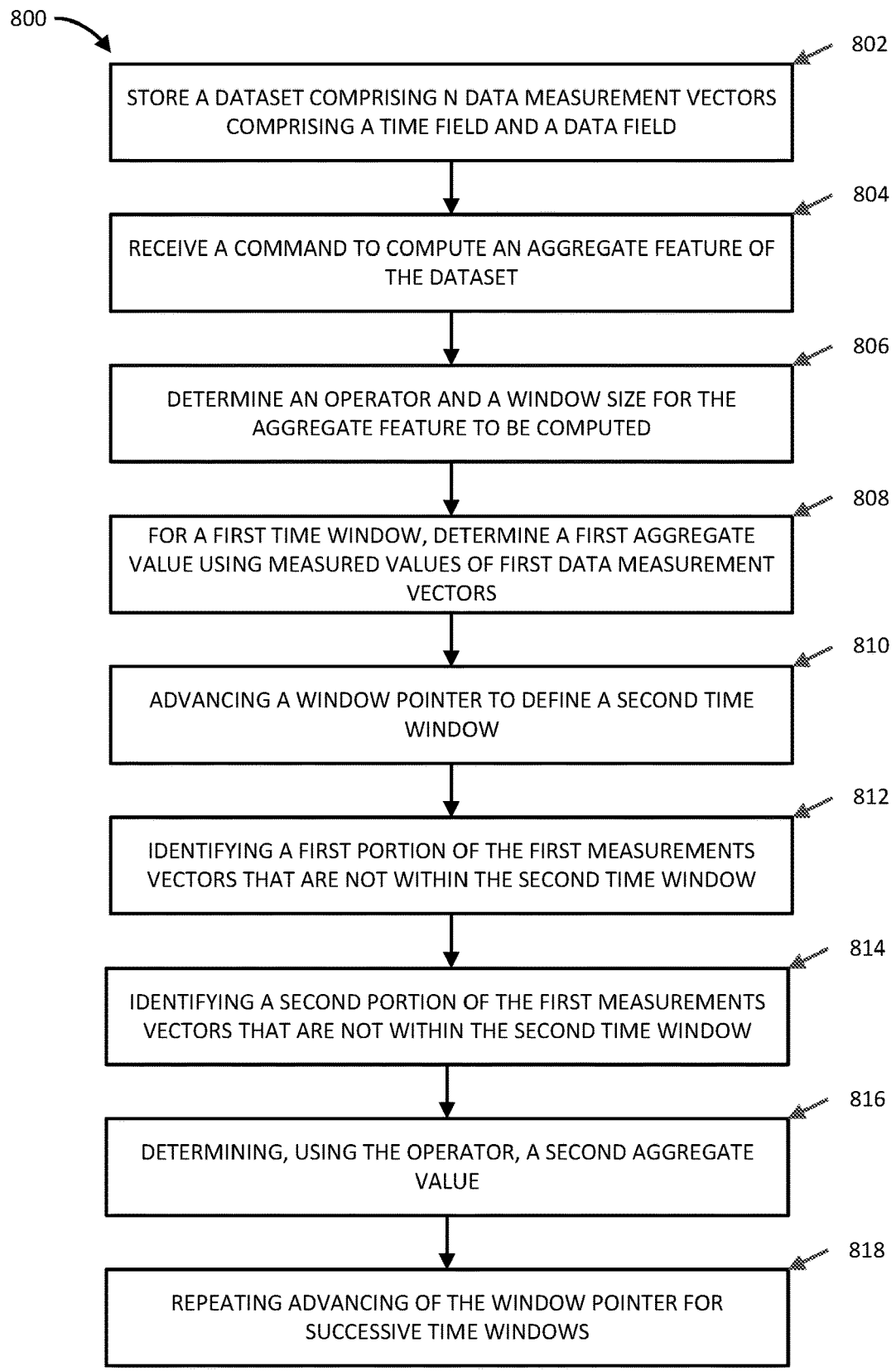
FIG. 8 shows a flowchart for a method according to embodiments.

FIG. 8 shows a flowchart for a method 800 according to embodiments. The method 800 may apply a scalable window aggregator to a dataset to compute an aggregate feature of the dataset. The method 800 may be performed by a computer, such as a server computer that communicates with various external devices.

At step S808, the computer may apply the operator with the window to the processed dataset to compute the aggregate feature of the dataset. At each step of the computation, the moving condition may be checked to determine if the current a window pointer of the window should be moved. If the moving condition is met, the window pointer can be moved and values outside of the window can be removed from the computation. For example, as described in FIGS. 4A and 4B, after the fourth timestamp is reached, the moving condition is met and so the window pointer is moved forward. As a result of the window pointer moving forward, the old values that correspond to timestamps outside of the current window are removed from the computation of the sum. In some examples, if multiple aggregate features are to be computed, the computer may retrieve the first aggregate feature computed by a first operator to compute a second aggregate feature. For example, as described in FIGS. 6A and 6B, if both the maximum and the distinct count are to be computed, after the maximum operator is applied to the dataset, the distinct count operator may retrieve the tree map to determine the distinct count of the dataset. A similar process can occur if the sum operator and count operator are used to compute the sum and the count for some window, the average of that same window can be easily calculated as average=(sum/count).

At step 802, the computer can store a dataset comprising N data measurement vectors. Each data measurement vector can comprise a time field and a data field comprising a measured value of a property of a network system for a corresponding time value. For example, the computer may dataset from an external computer, such as an interaction processing computer, a network traffic computer, etc. Exemplary data fields include a value, a identifier, an approved count, a declined count, etc. The dataset can comprise of any number of N data measurement vectors, such as 100, 1,000, 10,000, 20,000, 50,000, 100,000, 500,000, or more. One example of the dataset includes the interaction dataset of FIG. 2. In some examples, the computer may additionally process the dataset. In some examples, the computer may process the dataset by inputting the dataset to a distributed system such that portions of the dataset are mapped to different processing nodes. One example of such a distributed system includes the SPARK framework. In other examples, the computer may process the null values that appear in the dataset by appending an identifiable random value to null value, such that the null values are mapped evenly to all processing nodes. In such examples, the operators can be configured to skip the null values in the computations of aggregate features.

At step 804, the computer may receive a command to compute an aggregate feature vector of an aggregate feature of the dataset. The aggregate feature vector can include a respective aggregate value of the data field for each of a plurality of sliding time windows spanning the dataset. For example, the computer can receive a command to compute a sum of an interaction value in the last 20 seconds. In this example, the aggregate feature vector would include the sum of the interaction value for each 20 second time window of the dataset. In some examples, the computer may receive a command to compute more than one aggregate feature vectors of the dataset. For example, the computer can receive a command to compute the sum of the interaction value of the dataset in the last 20 seconds, the minimum value of the dataset, the maximum value of the dataset, and the distinct count of the dataset.

At step 806, after receiving a command to compute an aggregate feature vector of an aggregate feature of the dataset, the computer may determine an operator for determining the respective aggregate values and a window size for the aggregate feature to be computed. Examples of operators can include a sum operator, a count operator, an average operator, a maximum operator, a minimum operator, a distinct count operator, etc. In some examples, operators may be constructed such that they operate on primitive data types to reduce the memory requirement and increase computation efficiency of the aggregate feature computation. Examples of windows sizes can include 1 second, 10 seconds, 20 seconds, 30 seconds, 10 minutes, 1 hour, 1 day, 1 year, etc. For example, the computer may receive a command to compute the sum of the interaction value of the dataset in the last 20 seconds. The computer may identify a "sum" is to be computed on the "interaction value" of the dataset with a time window of "20 seconds." The computer may then determine a sum operator and a 20 second time window is necessary to compute the desired aggregate feature. In some examples, the computer may additionally determine a moving condition that will be used in the computation of the aggregate feature (e.g., as described in FIGS. 4A/4B and FIGS. 6A/6B). One example of the moving condition is (window pointer<current timestamp− window size).

At step 808, after determining an operator and a window size for the aggregate feature to be computed, the computer may, for a first time window, determine a first aggregate value using the measured values of first data measurement vectors that have a time field within the first time window. For example, as illustrated by FIG. 4A, a window pointer may be used to define the first time window (e.g., the window pointer 402 initially points to the timestamp 10, such that the first time window is 10-30 seconds). The first aggregate value may then be computed for the first time window. For example, referring to FIG. 4A, the sum of the interaction value of the last 20 seconds may be determined for the timestamp of 10. As illustrated in FIG. 4A, the resultant sum may be computed to be equal to "2," and a similar process is performed for each timestamp in the first time window to determine the each sum in the aggregate feature computation 404A. In another example, illustrated by FIG. 6A, the first aggregate value may be determined by the measured values of the dataset 600 to the tree map 610A. The maximum value of the last 30 seconds may then be determined from the tree map 610A.

At step 810, after determining the first aggregate value, the computer may advance a window pointer to define a second time window that overlaps with the first time window. The second time window can include second data measurement vectors from the dataset, and one or more of the second data measurement vectors may be the same as one or more of the first data measurement vectors. The computer may advance the window pointer as a result of a moving condition being met. For example, the moving condition is met in FIG. 4A once the sum for the timestamp of 38. The moving condition can then cause the window pointer 402 to point to the timestamp of 20, as shown FIG. 4B. The 20 second time window 403 in FIG. 4A and the 20 second time window 403 in FIG. 4B are overlapping in that they both contain the timestamps (20, 25, and 38). A similar example is described by FIGS. 6A and 6B, where the window pointer 602 is moved after reaching the timestamp of 41, and the 30 second time window 603 of FIG. 6A shares the common elements (20, 25, and 38) with the 30 second time window 603 of FIG. 6B.

At step 812, after advancing the window pointer, the computer may identify a first portion of the first data measurement vector(s) that are not within the second time window. For example, referring to FIGS. 4A and 4B, after the window pointer 402 is moved to point to the timestamp 20 and a second time window is defined (e.g., 20-40 seconds), the computer may determine that the timestamp 10 is not in the second time window. Another example is illustrated by FIGS. 6A and 6B, wherein after the window pointer 602 is moved to point to the timestamp 20, the computer may determine that the timestamp 10 is not in the second time window.

At step 814, after advancing the window pointer, the computer may identify a second portion of the second data measurement vector(s) that are not within the first time window. For example, referring to FIGS. 4A and 4B, after the window pointer 402 is moved to point to the timestamp 20, the computer may determine that the timestamp 38 is included in the second time window of 20-40 seconds but was not in the first time window of 10-30 seconds. The computer can then identify the values associated with the identified timestamp (e.g., the value 28 that is associated with the timestamp 38). Similarly in FIGS. 6A and 6B, after the window pointer 602 is moved to point to the timestamp 20, the computer may determine that the timestamps 41 and 49 are included in the second time window of 20-50 seconds but were not in the first time window of 10-40 seconds. The computer can then identify the values associated with the identified timestamps (e.g., the value 8 associated with the timestamp 41 and the value 28 associated with the timestamp 49).

At step 816, after identifying a first portion of the first data measurement vector(s) that are not within the second time window and a second portion of the second data measurement vector(s) that are not within the first time window, the computer can, using the operator, determine a second aggregate value. The second aggregate value may be determined by removing the measured value(s) for the first portion of the first data measurement vector(s) from the first aggregate value and including the measured value(s) for the second portion of the second data measurement vector(s) within the first aggregate value. For example, referring to FIG. 4B, after the window pointer 402 is moved, the sum for the timestamp 38 is calculated by adding the value of the non-overlapping portion of the second time window (3) to the previous sum (9) and subtracting the value of the non-overlapping portion of the first time window (2) to compute the sum of 12. Similarly, referring to FIG. 6B, after the window pointer 602 is moved, the tree map 610B is modified to include the values of the non-overlapping portion of the second time window (8, 28) and removing the value of the non-overlapping portion of the first time window (2) to determine the maximum from the tree map 610B.

At step 818, the computer may repeat advancing of the window pointer for successive time windows and repeat identification of data measurement vectors to remove and to include, for the operator to determine successive aggregate values for the successive time windows of the plurality of sliding time windows.

Embodiments of the present invention have a number of benefits. Embodiments provide for a scalable window aggregator to compute aggregate features of a dataset. Embodiments receive an indication of an aggregate feature to be calculated and determine an appropriate operator and window. Embodiments provide a reduction in the memory requirement and an increase in computation efficiency of computing aggregate features of large datasets. For example, through operators sharing windows, and windows sharing data fields, a reduction in the memory requirement is provided as there is no need to reproduce the data fields for different windows. Additionally, embodiments provide for a method to reduce the skew caused by null values and improve the computation efficiency. Null values in datasets can be prefaced with identifiable random values, such that they are evenly distributed across processing nodes of a computer.

V. Computer System

Figure 9:
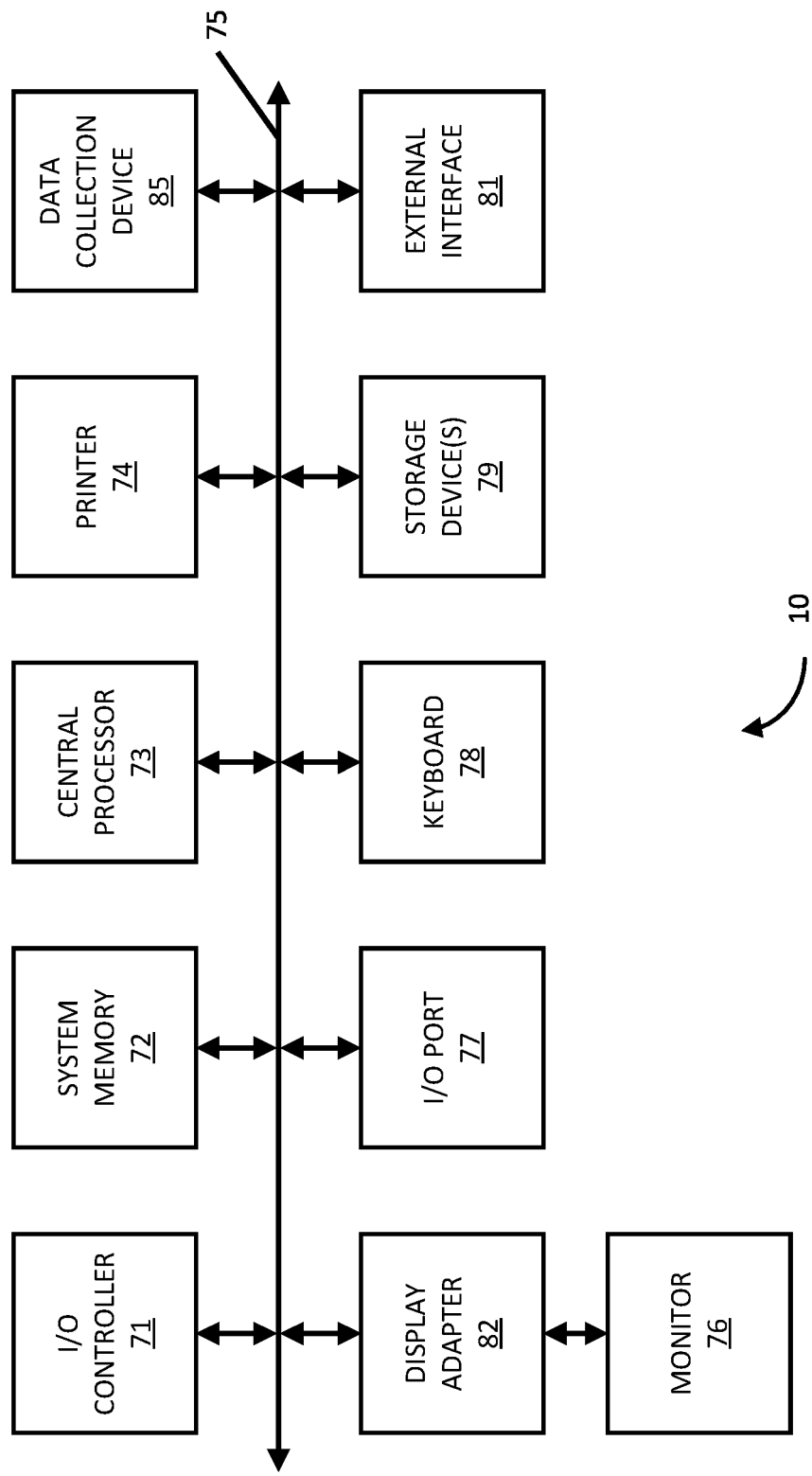
FIG. 9 shows a block diagram of an exemplary computer system according to embodiments.

FIG. 9 shows a block diagram of an exemplary computer system 10 according to embodiments of the present invention.

Any of the computer systems mentioned herein may utilize any suitable number of subsystems. Examples of such subsystems are shown in FIG. 9 in computer apparatus 10. In some examples, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some examples, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. For example, the dataset may be processed before the instructions to compute an aggregate feature are received. Additionally, portions of these steps may be used with portions of other steps from other methods. Also, all or portions of a step may be optional. Additionally, any of the steps of any of the methods can be performed with modules, units, circuits, or other means of a system for performing these steps.

The specific details of particular embodiments may be combined in any suitable manner without departing from the spirit and scope of embodiments of the disclosure. However, other embodiments of the disclosure may be directed to specific embodiments relating to each individual aspect, or specific combinations of these individual aspects.

The above description of example embodiments of the present disclosure has been presented for the purposes of illustration and description. It is not intended to be exhaustive or to limit the disclosure to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned herein and in the appendix are incorporated by reference in their entirety for all purposes. None is admitted to be prior art. Where a conflict exists between the instant application and a reference provided herein, the instant application shall dominate.

What is claimed is:

1. A method of processing a dataset by a computer, the method comprising:
    storing the dataset comprising N data measurement vectors, each data measurement vector comprising a time field and a data field, wherein N is at least 100,000, wherein the data field of each data measurement vector comprises a measured value of a property of a network system for a corresponding time value;
    receiving a command to compute an aggregate feature vector of an aggregate feature of the dataset, wherein the aggregate feature vector includes a respective aggregate value of the data field for each of a plurality of sliding time windows spanning the dataset;
    determining an operator for determining the respective aggregate values and a window size for the aggregate feature to be computed;
    for a first time window, determining with the operator a first aggregate value using the measured values of first data measurement vectors having the time field within the first time window;
    advancing a window pointer to define a second time window, wherein the second time window overlaps with the first time window, and wherein the second time window includes second data measurement vectors;
    identifying a first portion of the first data measurement vectors that are not within the second time window;
    identifying a second portion of the second data measurement vectors that are not within the first time window;
    determining, using the operator, a second aggregate value by:
        removing the measured value(s) for the first portion of the first data measurement vectors from the first aggregate value; and
        including the measured value(s) for the second portion of the second data measurement vectors within the first aggregate value; and
    repeating advancing of the window pointer for successive time windows and repeating identification of data measurement vectors to remove and to include, for the operator to determine successive aggregate values for the successive time windows of the plurality of sliding time windows.

2. The method of claim 1, wherein the dataset comprises interaction data including one or more of a value, an approved interaction count, a declined interaction count, or an identifier.

3. The method of claim 1, further comprising:
    processing the dataset using a distributed system to distribute portions of the dataset to different processing nodes of the computer.

4. The method of claim 3, wherein processing the dataset comprises modifying null values in the dataset to include identifiable random values, and wherein the operator is configured to skip the null values in the computation of the aggregate feature of the dataset.

5. The method of claim 1, wherein the aggregate feature of the dataset includes one of a value, a count, an average, a maximum, a minimum, or a distinct count.

6. The method of claim 1, wherein the window pointer is advanced after a moving condition is met.

7. The method of claim 6, wherein the moving condition is defined by at least a value in the time field, the window size, and the window pointer.

8. The method of claim 1, wherein the aggregate feature vector is a first aggregate feature vector of a first aggregate feature, the method further comprising:
    receiving a second command to compute a second aggregate feature vector of a second aggregate feature of the dataset, wherein the second aggregate feature is different from the first aggregate feature of the dataset;
    determining a second window size for the second aggregate feature to be computed; and
    computing the second aggregate feature using the operator, the second window size, and the measured values of first data measurement vectors.

9. The method of claim 1, wherein the processed dataset comprises a unrolled linked list.

10. The method of claim 1, wherein the aggregate feature vector is a first aggregate feature vector of a first aggregate feature, the method further comprising:
    receiving instructions to compute a second aggregate feature vector for a second aggregate feature of the dataset;
    retrieving the first aggregate feature vector of the dataset; and
    computing the second aggregate feature vector of the dataset using at least the first aggregate feature vector of the dataset.

11. The method of claim 10, wherein the first aggregate feature is a sum or count and the second aggregate feature is an average, or wherein the first aggregate feature is a maximum or a minimum and the second aggregate feature is a distinct count.

12. The method of claim 1, wherein the operator is a one of a sum operator, a count operator, an average operator, a maximum operator, a minimum operator, or a distinct count operator.

13. The method of claim 1, wherein determining with the operator the first aggregate value using the measured values of first data measurement vectors having the time field within the first time window comprises building a tree map using the measured values of first data measurement vectors.

14. The method of claim 1, wherein the aggregate feature includes an indication of an operation and a time interval, and wherein the operator is determined based on the operation and a sliding time window is determined based on the time interval.

15. A computer comprising:
a processor; and
a non-transitory computer readable medium comprising instructions executable by the processor to perform a method of processing a dataset by a computer, the method comprising:
storing the dataset comprising N data measurement vectors, each data measurement vector comprising a time field and a data field, wherein N is at least 100,000, wherein the data field of each data measurement vector comprises a measured value of a property of a network system for a corresponding time value;
receiving a command to compute an aggregate feature vector of an aggregate feature of the dataset, wherein the aggregate feature vector includes a respective aggregate value of the data field for each of a plurality of sliding time windows spanning the dataset;
determining an operator for determining the respective aggregate values and a window size for the aggregate feature to be computed;
for a first time window, determining with the operator a first aggregate value using the measured values of first data measurement vectors having the time field within the first time window;
advancing a window pointer to define a second time window, wherein the second time window overlaps with the first time window, and wherein the second time window includes second data measurement vectors;
identifying a first portion of the first data measurement vectors that are not within the second time window;
identifying a second portion of the second data measurement vectors that are not within the first time window;
determining, using the operator, a second aggregate value by:
removing the measured value(s) for the first portion of the first data measurement vectors from the first aggregate value; and
including the measured value(s) for the second portion of the second data measurement vectors within the first aggregate value; and
repeating advancing of the window pointer for successive time windows and repeating identification of data measurement vectors to remove and to include, for the operator to determine successive aggregate values for the successive time windows of the plurality of sliding time windows.

16. The computer of claim 15, wherein the window pointer is advanced after a moving condition is met.

17. The computer of claim 15, wherein the aggregate feature vector is a first aggregate feature vector of a first aggregate feature, the method further comprising:
receiving a second command to compute a second aggregate feature vector of a second aggregate feature of the dataset, wherein the second aggregate feature is different from the first aggregate feature of the dataset;
determining a second window size for the second aggregate feature to be computed; and
computing the second aggregate feature using the operator, the second window size, and the measured values of first data measurement vectors.

18. The computer of claim 15, wherein the aggregate feature vector is a first aggregate feature vector of a first aggregate feature, the method further comprising:
receiving instructions to compute a second aggregate feature vector for a second aggregate feature of the dataset;
retrieving the first aggregate feature vector of the dataset; and
computing the second aggregate feature vector of the dataset using at least the first aggregate feature vector of the dataset.

19. The computer of claim 15, wherein determining with the operator the first aggregate value using the measured values of first data measurement vectors having the time field within the first time window comprises building a tree map using the measured values of first data measurement vectors.

20. The computer of claim 15, wherein the aggregate feature includes an indication of an operation and a time interval, and wherein the operator is determined based on the operation and a sliding time window is determined based on the time interval.

* * * * *